(12) United States Patent
Garrec

(10) Patent No.: US 7,389,974 B2
(45) Date of Patent: Jun. 24, 2008

(54) SCREW, NUT AND CABLE TRANSMISSION

(75) Inventor: Philippe Garrec, Yvette (FR)

(73) Assignee: Commissariat a l'Energie Atomique, Paris (FR)

(*) Notice: Subject to any disclaimer, the term of this patent is extended or adjusted under 35 U.S.C. 154(b) by 262 days.

(21) Appl. No.: 10/548,980

(22) PCT Filed: Mar. 11, 2004

(86) PCT No.: PCT/FR2004/050101

§ 371 (c)(1), (2), (4) Date: Sep. 12, 2005

(87) PCT Pub. No.: WO2004/083683

PCT Pub. Date: Sep. 30, 2004

(65) Prior Publication Data

US 2006/0191362 A1    Aug. 31, 2006

(30) Foreign Application Priority Data

Mar. 14, 2003 (FR) .................................. 03 50046

(51) Int. Cl.
*B66D 3/08* (2006.01)

(52) U.S. Cl. ........................ 254/394; 254/398; 74/89.34; 74/89.23; 74/89.33

(58) Field of Classification Search .................. 254/393, 254/394, 396, 398; 74/89.34, 39.23, 89.31, 74/89.32, 89.33
See application file for complete search history.

(56) References Cited

U.S. PATENT DOCUMENTS

| 4,537,084 | A  | * | 8/1985 | Passemard et al. ......... 74/89.22 |
| 4,697,472 | A  |   | 10/1987 | Hiyane |
| 4,926,709 | A  | * | 5/1990 | Gardner .................... 74/89.31 |
| 5,937,699 | A  |   | 8/1999 | Garrec |
| 7,073,406 | B2 | * | 7/2006 | Garrec ....................... 74/89.34 |
| 2003/0074990 | A1 |   | 4/2003 | Garrec |

FOREIGN PATENT DOCUMENTS

| DE | 202 02 440 U | 2/2002 |
| FR | 2 640 607 | 6/1990 |
| FR | 2 807 959 | 10/2001 |
| JP | S62-157 788 | 7/1986 |
| JP | S62-192 486 | 8/1986 |
| JP | S62-188 690 | 8/1987 |

* cited by examiner

*Primary Examiner*—Emmanuel M Marcelo
(74) *Attorney, Agent, or Firm*—Thelen Reid Brown Raysmans & Steiner LLP

(57) ABSTRACT

A screw, nut and cable transmission device (6, 7, 12, 13, 20 and 21) between a motor (5) and a device (1, 2) which is to be moved and which is made up of at least one double pulley (14), which amplifies the movement of the cable line (20) which is close to the device, relative to that of the cable line (12) which is close to the screw (7). By sacrificing part of the usual advantage of reduction of movement provided by the screw, (7) a greater movement travel for the device (1) is obtained for the same size constraints or constraints due to the length of the screw (7).

6 Claims, 4 Drawing Sheets

SCREW, NUT AND CABLE TRANSMISSION

CROSS-REFERENCE TO RELATED APPlICATION

Figure 1:
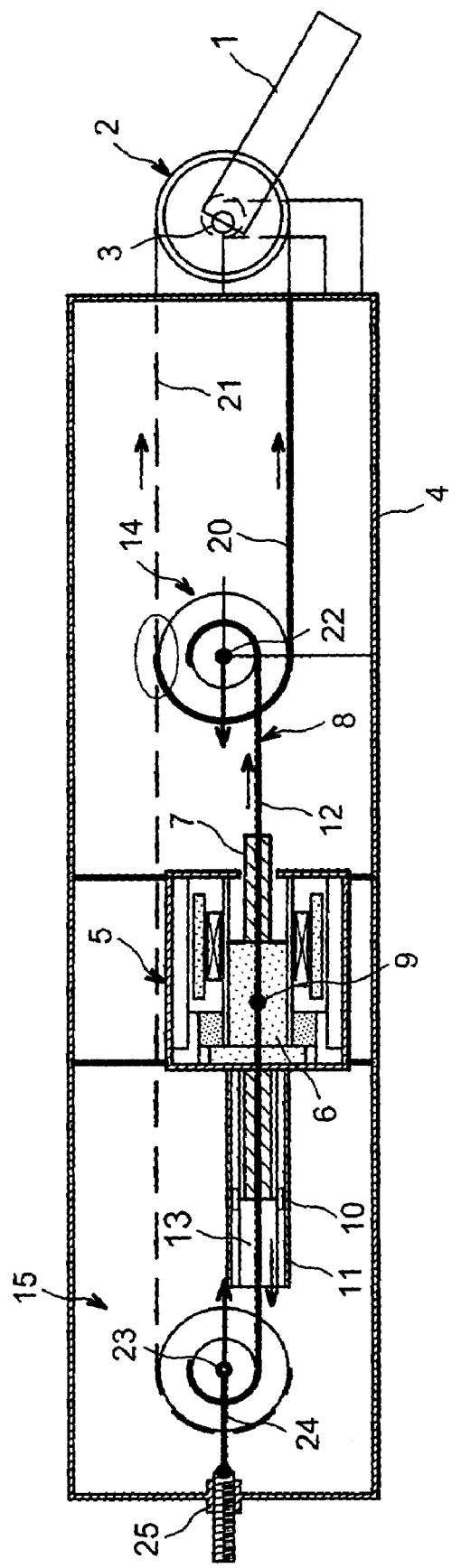

This application claims priority based on International Patent Application No. PCT/FR2004/050101, entitled "Screw, Nut and Cable Transmission" by Philippe Garrec, which claims priority of French Application No. 03 50046, filed on Mar. 14, 2003, and which was not published in English.

The subject of this invention is a nut, screw and cable transmission which is an improvement on that, for example, in French patent 2 809 464.

Such transmissions between a motor and a driven device are made up of a nut which is turned by a motor, a screw which is engaged in the nut by means of threads but which is prevented from rotating by a slide or an analogous method, and a cable attached to the screw. The rotation of the motor causes the nut to rotate, which produces translation of the screw and pulls the cable which drives the device. This type of transmission has certain advantages, including lightness, ease of adaptation to various dimensions and the conversion of rotation into translation in a manner which may or may not be reversible. These various advantages provide these transmissions with various benefits in the control of telescopic movement of cylindrical devices in robotics or analogous fields. Another advantage which was emphasised in the earlier patent is the reduction effect on movement which allows a significant force to be applied to the device being driven, concomitantly with a low speed which is generally acceptable for these applications.

A problem often encountered is the length of the screw, upon which the travel provided for the device being driven depends. Screws must in general remain housed in a restricted volume, such as the interior of a robotic mechanical link, whose limits are quickly reached if it is designed to be too long. Even when very long screws can be allowed in kinematic terms, these continue to have the drawback of the corresponding overhang between the nut which supports it and the point of attachment of the cable. It is then subjected to large flexion forces, which have always proven to be a serious drawback of these transmissions.

The modification to the previous transmission that is offered by this invention is based on the principle of relinquishing some of the reduction capacity with all of its advantages in favour of a reduction in the length of the screw relative to the length of travel. Specifically, a movement amplifier is fitted to the cable between the screw and the device being driven and divides the cable in two.

One aspect of the invention is, therefore, a transmission which includes a nut turned by a motor, a screw engaged in the nut, a means of stopping the rotation of the nut and a cable attached to the screw and to which a device to be driven is attached, characterised by the fact that it is made up of a double pulley with an axis of rotation that is fixed in relation to the motor, which in turn is made up of an elementary pulley of large diameter and an elementary pulley of small diameter, so that the cable is composed of two successive lines, one of which is stretched between the elementary pulley of small diameter and the screw, and the other stretched between the elementary pulley of large diameter and the device being driven.

A second aspect of the invention concerns such a transmission characterised by the fact that it includes a second double pulley, made of an elementary pulley of large dimension and an elementary pulley of small dimension, with the screw placed between the double pulleys, and a second cable, made up of two successive lines, one of which is stretched between the elementary pulley of small diameter and the screw, and the other is stretched between the elementary pulley of large diameter and the device being driven.

It is possible, therefore, for the cable lines stretched between the elementary pulleys of large diameter and the device being driven to be successive portions of a single cable passing to the side of the screw. This arrangement is simple, especially so because a single tensioning device can be associated with the entire cable-run, where this may be a device for adjusting the position of the axis of the second double pulley in relation to the motor.

An improvement to the earlier method of fabrication involves the use of a guide pulley on which the line stretched between the elementary pulley of large diameter and the device being driven runs so as to perform a half-turn, with the guide pulley being closer to the nut than the double pulley.

Figure 2:
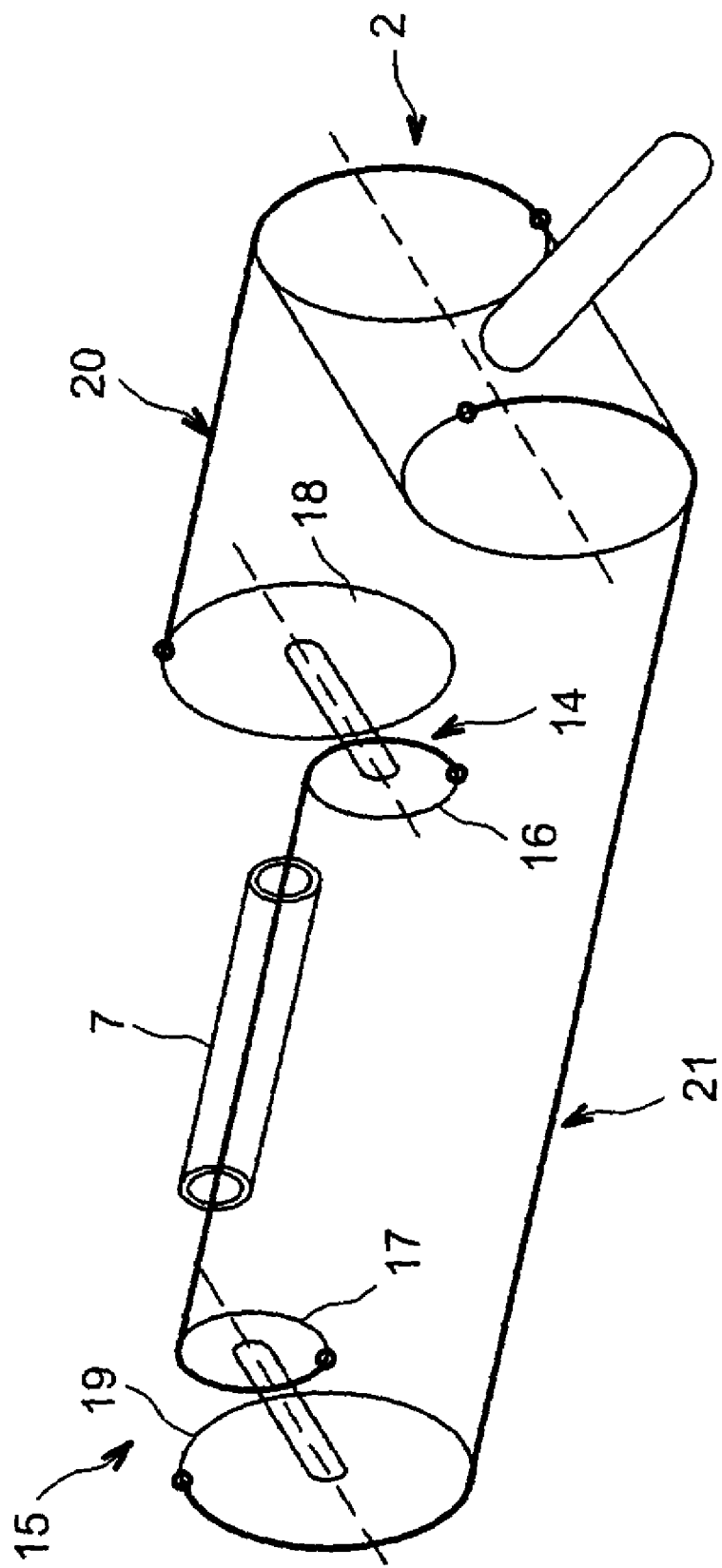
Figure 3:
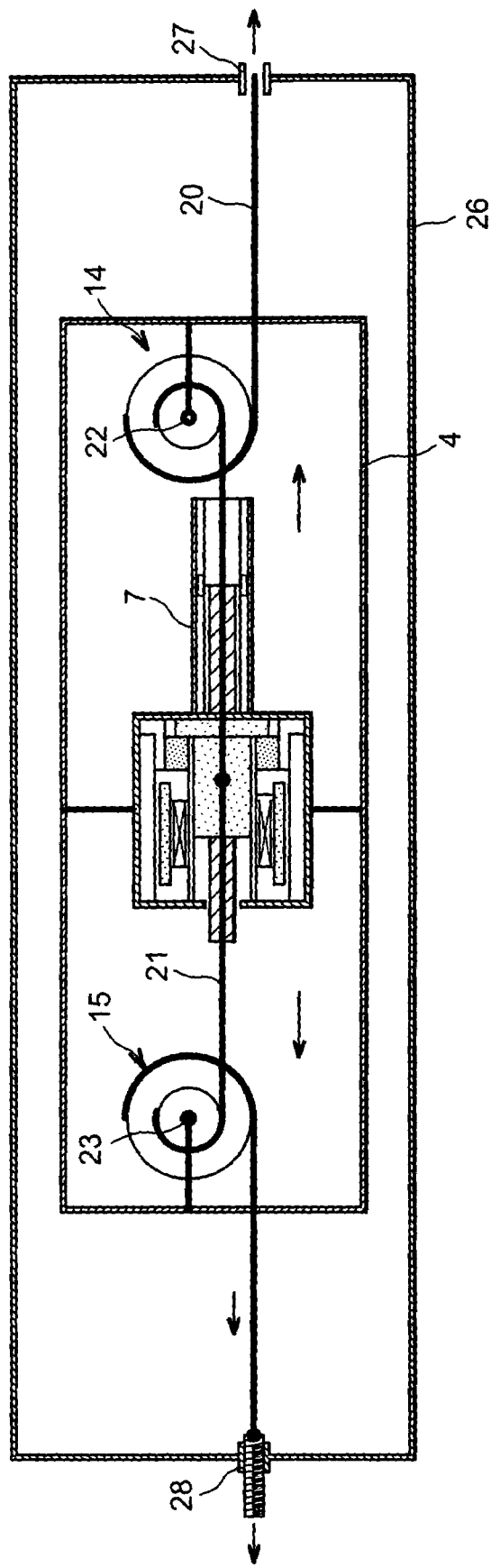
Figure 4:
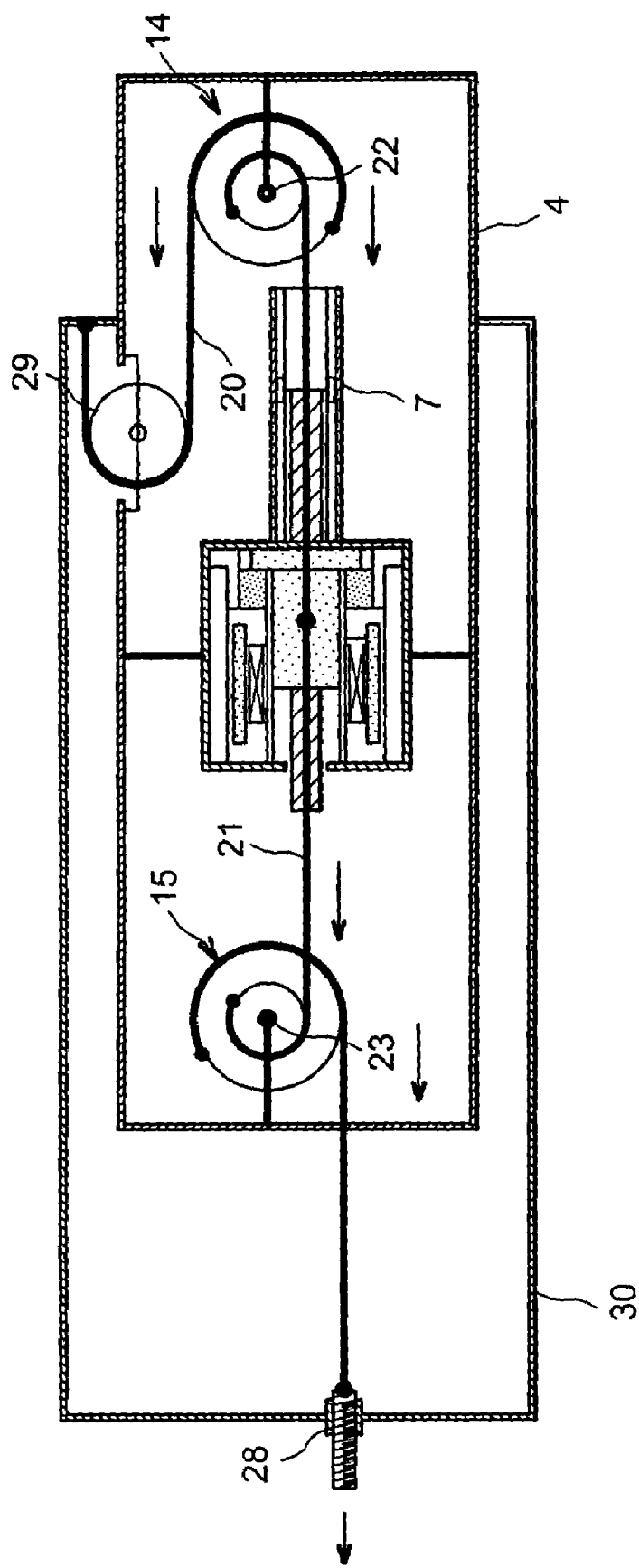

The invention will from here on be described in association with FIGS. 1 to 4, where FIGS. 1, 3 and 4 illustrate three different options for manufacture of the invention and where FIG. 2 is a schematic diagram to provide help in understanding FIG. 1.

FIGS. 1 and 2 are concerned with the control of the rotation of a device 1 in the form of lever, such as a robotic mechanical joint, around a pulley 2 whose axis 3 is supported by a casing 4 which covers the transmission in this invention. The casing 4 includes an electric motor 5 whose stator is fixed to the casing 4 and which is hollow and contains a nut 6 which it drives. Inside this nut is engaged a screw 7, extending through the motor 5 towards the pulley 2. A cable 8 is attached to the screw 7, preferably at a mid-length position and enclosed in the nut 6 or at a short distance from it in order to reduce the flexion moments on the screw 7. The point of attachment is shown as reference 9. One end of the screw 7 bears rollers 10 on a slide 11 parallel to the screw, in order to prevent rotation of the screw. The rotation of the nut 6 is therefore transmitted as a translation movement of the screw 7 and of the cable 8. The cable 8 is made up of two lines 12 and 13 on either side of the point of attachment 9 which lead to two double pulleys 14 and 15, between which the motor 12 is located. Each of the double pulleys 14 and 15 are made up of pulleys of small diameter 16 and 17, to which the end of line 12 or 13 opposite the point of attachment 9 is fixed, and pulleys of large diameter 18 or 19, to which are fixed other cable lines 20 and 21, which both lead to pulley 2. The cable-run therefore forms a loop which is almost continuous apart from double pulleys 14 and 15. Since the various pulleys are offset laterally, cable line 21, for example, passes alongside the motor 5 and alongside the other pulley 18 of large diameter. Axis 22 of the double pulley 14 is fixed in relation to the casing 4, but axis 23 of double pulley 15 may be moved in relation to the motor 5. For example, it may be at the end of a tie-rod 24 whose position can be adjusted by turning a threaded bush 25 into which it is engaged, which is fixed to casing 4 but which is still being capable of being rotated. The assembly forms a single tensioning device, which is, by itself, capable of modifying the tension throughout the entire cable-run and giving it the desired tension.

From the ratio of diameters of the pulleys 16, 17 and 18, 19, it is obvious that a translation movement of screw 7 will cause a large movement of the same ratio in the cable lines 20 and 21, and will therefore cause greater rotation of the arm 1 than in the absence of pulleys 14 and 15.

The double cable and double pulley system 14 and 15 is useful for the control of movement in two directions. If a movement in a single direction is sufficient (if, for example gravity or a spring always carries out a return movement), a single double-pulley system is sufficient.

Moving on to FIG. 3, the option for manufacture that it shows is designed to control a translation movement, but includes many elements which are common with the above and which will therefore bear the same references. The rotating device 1 is replaced by a casing 26 which runs around the casing 4 encountered earlier and fully encloses it. The axes 22 and 23 of double pulleys 14 and 15 are here both fixed to casing 4 at fixed positions. The lines 20 and 21 attached to pulleys of large diameter 18 and 19 are fixed directly to attachment points 27 and 28 which are at opposite ends of the external casing 26. The rest of the system remains unchanged. The translation movement of the screw 7 directly produces a translation movement of the external casing 26 with a movement ratio that is equal to the ratio of the pulleys of large diameter 18 and 19 to the pulleys of small diameter 16 and 17. The tension in the cable-runs may be adjusted by modifying the tension at the points of attachment 27 and 28.

The system in FIG. 3 is satisfactory from the kinematic point of view, but has the drawback of having the external casing surrounding the other casing and therefore of being bulky. This can be remedied by the improvement shown in FIG. 4, in which a guide pulley 29 is added to casing 4 and which is placed, for example, not far from motor 5, and in all cases between the double pulleys 14 and 15. The cable line 20 then passes over the guide pulley 29 and makes a half-turn over it to return in the direction it had in FIG. 3, with its end being attached to the external casing, which here bears reference 30, since it is shorter. A telescopic movement of casings 4 and 30 therefore becomes possible, with casing 4 being able to fully withdraw into or fully emerge from external casing 30. The rest of the previous arrangement is unchanged.

The invention claimed is:

1. Transmission which includes a nut (6) turned by a motor (5), a screw (7) engaged in the nut, a means (10, 11) of stopping the rotation of the nut and a cable (8) attached to the screw (7) and to which a device being driven (1, 26) is attached, characterised by the fact that it is made up of a double pulley (14) with an axis of rotation that is fixed in relation to the motor, made up of an elementary pulley of large diameter (18) and an elementary pulley of small diameter (16), so that the cable is made up of two successive cable lines, one of which (12) is stretched between the elementary pulley of small diameter and the screw, and the other (20) stretched between the elementary pulley of large diameter and the device being driven.

2. Transmission as in claim 1, characterised by the fact that it includes a second double pulley (15), made of an elementary pulley of large dimension and an elementary pulley of small dimension, with the screw located between the double pulleys, and a second cable, made up of two successive cable lines, one of which is stretched between the elementary pulley of small diameter and the screw, and with the other stretched between the elementary pulley of large diameter and the device being driven.

3. Transmission as in claim 2, characterised by the fact that the cable lines (20, 21) stretched between the elementary pulleys of large diameter and the device being driven are the successive portions of a single cable passing to one side of the screw.

4. Transmission as in claim 3, characterised by the fact that it includes a single tensioning device (25).

5. Transmission as in claim 4, characterised by the fact that the tensioning device is a position adjuster for the axis of the second double pulley in relation to the motor.

6. Transmission as in claim 1, characterised by the fact that it involves the use of a guide pulley (29) on which the line stretched between the elementary pulley of large diameter and the device is run whilst making a half turn, with the guide pulley being closer to the nut than the double pulley.

* * * * *